Patented Dec. 29, 1936

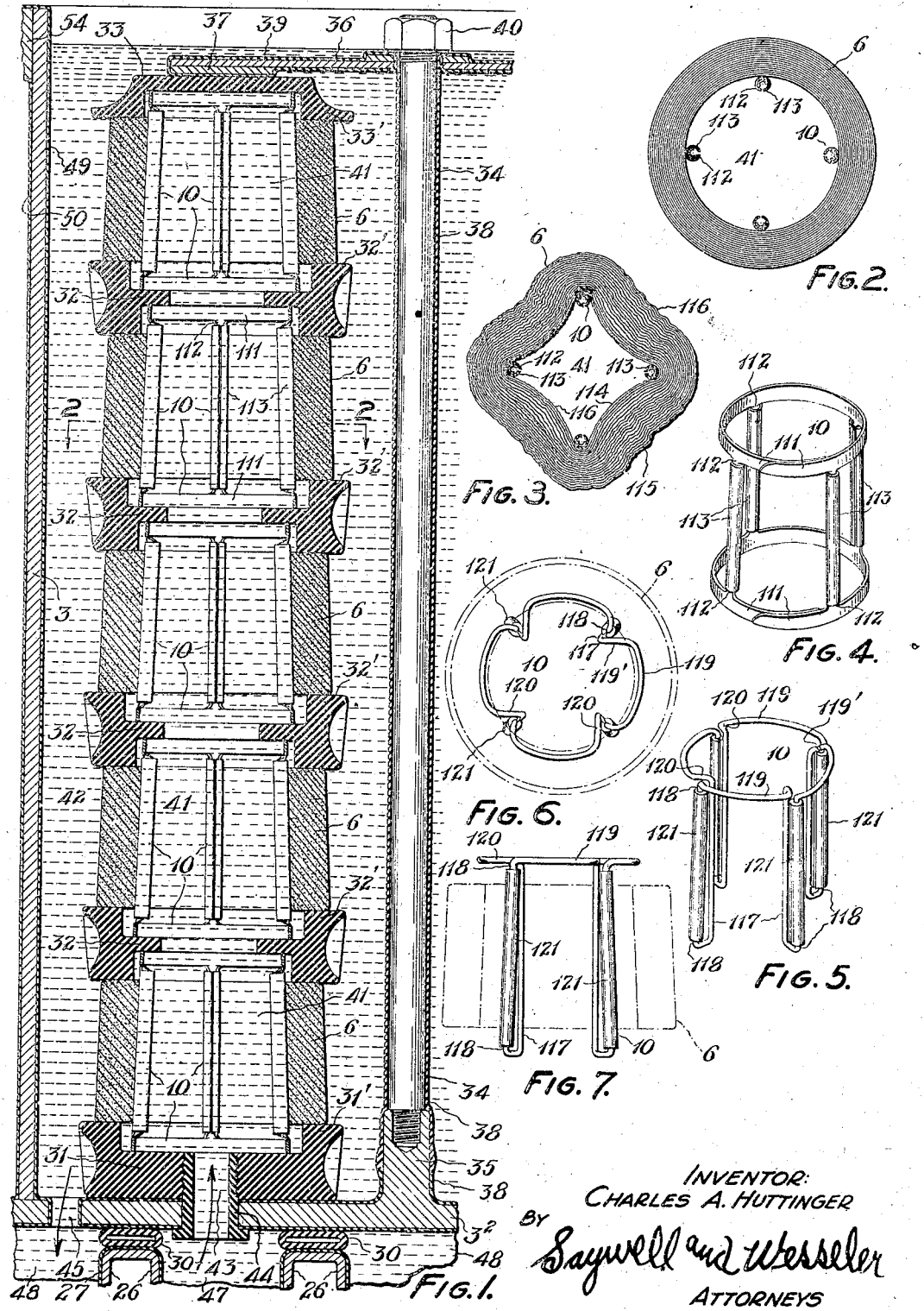

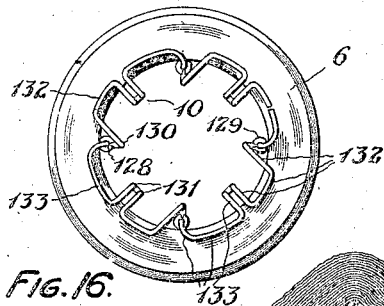
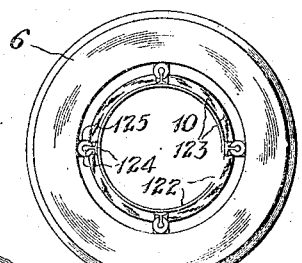
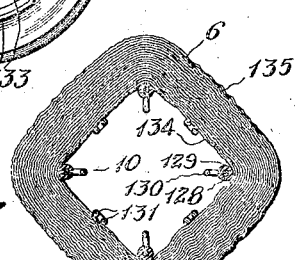
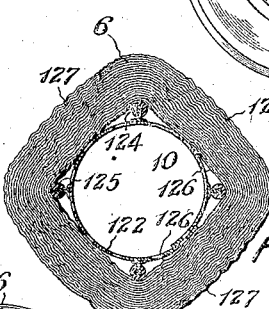
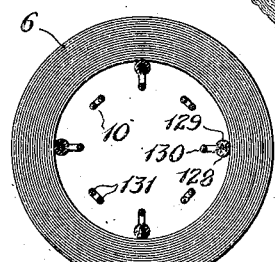
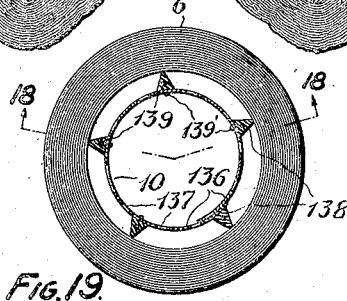
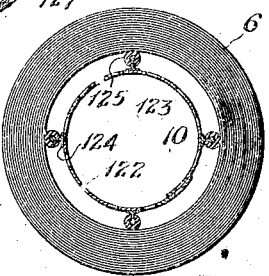
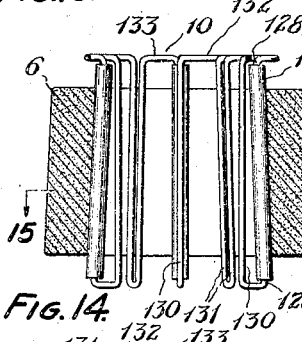
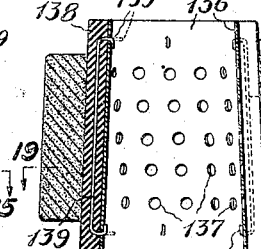
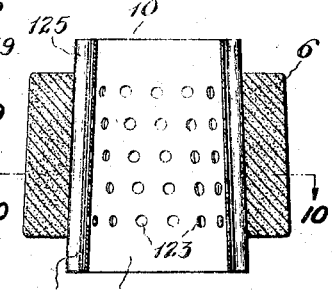
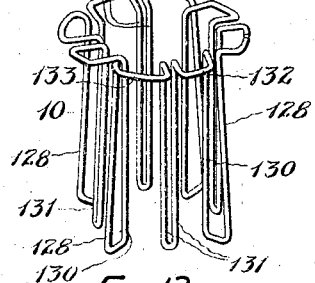
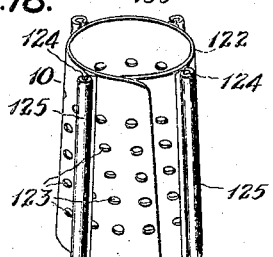

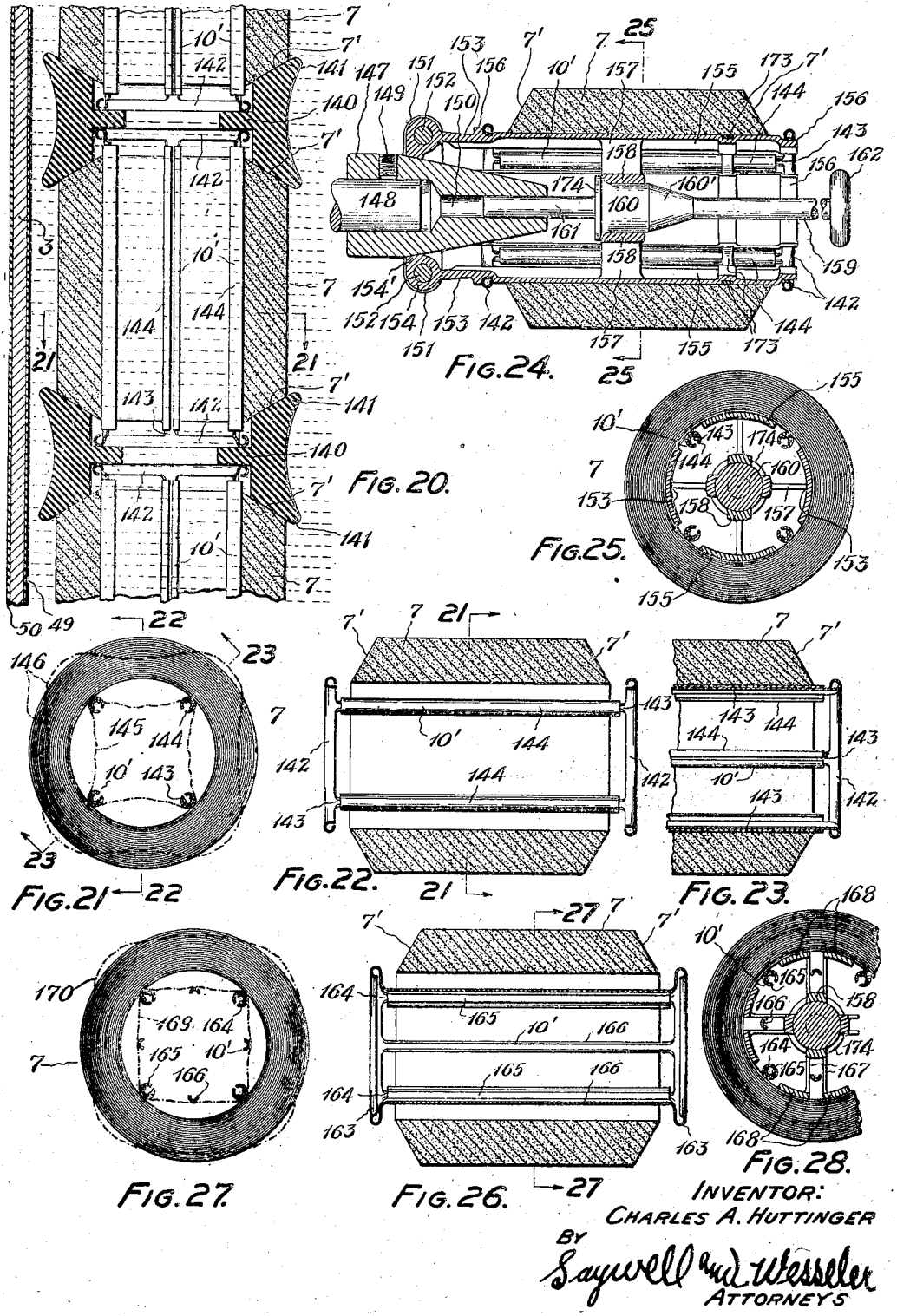

2,065,526

UNITED STATES PATENT OFFICE 2,065,526

MEANS FOR USE IN SPINNING AND IN LIQUID TREATING TUBULAR RAYON PACKAGES

Charles A. Huttinger, Lakewood, Ohio, assignor to Acme Rayon Corporation, Cleveland, Ohio, a corporation of Ohio Application May 5, 1934, Serial No. 724,114

16 Claims. (Cl. 18—8)

In another application filed even date herewith, Serial No. 724,113, I have shown, described and claimed improved apparatus for treating fine filamentous thread; as also, described and claimed improved processes for treating such thread. A part of the apparatus set forth in said application is improved package-supports for use in liquid-treating such thread, and improved support-attachments for the wound-bobbin-supporting-and-rotating spindles of package-spinning machines. The forms of package-supports and attachments shown and described in said other application are some of those shown, described, and claimed in the instant application.

The invention claimed in said other application relates to improved methods and apparatus for liquid-treating rayon in package form, such as cakes, wound spools or bobbins, etc., after the rayon thread has been collected in such forms on spinning machines from the precipitating bath in which the rayon filaments are set up. The rayon thread as so collected is comprised of a comparatively large number of filaments which are twisted as some forms of packages are being collected, and are collected untwisted in other forms of packages.

The treatments to which the rayon package is subjected by the improved process and apparatus claimed in said other application are the different treatments to which the rayon is necessarily subjected, before the precipitated and package-collected thread can be considered a final product ready for the market, such as various water washings, desulphurizing, bleaching, oiling, sizing, dyeing, drying, and other purifying and finishing operations.

Primarily, the process of said other application consists in loosening up the package, when purifying the same in its initial collected form, so as to provide for all parts of the package their respective natural scopes of free play, relative to other parts of the package, thus effecting a natural alteration of the relative positions of all parts of the thread comprising the package and of the different portions of the package. This is done without injuriously disarranging the thread or the filaments thereof, so that the package may be dried in the treated package form, preliminary to the sale thereof for the market, or to the rewinding thereof into some other form of package for such sale, without inducing strains or an immobile condition in any portion of the package which would result in a non-uniform dyeing or barred effect. The purification and other treatments of the package are carried out without unduly impairing the tenacity and elasticity of the thread required for later handling and processing or for use, and without setting up local tension areas or non-uniform strains. Essentially, the process consists in pulsating the package body by means of the treating liquid on the openings of improved forms of perforated inserts or bobbins upon which the package is mounted and while spaced portions of the latter are free to move to a predetermined extent, through said insert openings, under the pressure of the treating liquid.

The inserts and bobbins, above-mentioned, upon and through the openings of which the pulsating package body is free to move, and improved bobbin-attachments form the subject matter claimed in the instant application.

In said other application there is a disclosure of processes of, and means for, causing the treating liquid alternately to flow in opposite directions through tubular rayon packages, viz., from the outer face to the inner face, and from the inner face to the outer face. When the treating liquid passes from without the tubular rayon package through the body thereof and into the interior of the package, the package is deformed by reason of parts thereof moving inwardly through the openings of the insert or bobbin upon which the package is mounted. This inward movement is under the pressure of the treating liquid and is preferably permitted up to a predetermined maximum extent, and loosens up the package to a degree and permits a natural altering of the relative positions of the parts of the thread comprising the package and of different portions of the package.

Said other application also explains how rayon packages of the character therein shown are spun so that the strands of the outer face of the package prevent any material enlargement of the package perimeter. Therefore, the pressure of the treating liquid from within the package outwardly, i. e., when the flow of treating liquid is toward the outer face of the package, does not bulge or deform the package outwardly so as to increase its perimeter, under any pressures that are practicably usable for such treatments. However, those portions of the package which are not moved inwardly by liquid passed inwardly of the package body are adjusted somewhat outwardly during such treatment, as clearly shown in the accompanying drawings and as will hereinafter be fully described. Explanation is also made of the fact that at some stages of the process complete passage of the treating liquid through the package would not be effected, but only a tendency to pass through the package in the direction of liquid flow; also, that after the package had once been inwardly deformed, it would reestablish itself in its original form, or tend to so reestablish itself, when the direction of liquid flow is again outwardly of the package.

Said other application makes a disclosure of certain methods and means for assembling a plurality of packages in a series of vertically-aligned tiers in a treatment casing within which the packages are subjected to the action of the treating liquid. Means are disclosed for recirculating the treating liquid through the treatment casing and the packages mounted therein, and for automatically and adjustably periodically reversing the direction of liquid flow.

Said other application illustrates the use and application of the improved process and apparatus therein disclosed, by reference to a water-washing of rayon cakes and wound rayon bobbins. It is also disclosed in said other application that packages of the wound bobbin or spool shape are collected from the spinning machines upon perforated bobbins or supports and that it is the purpose of the invention disclosed in said application to liquid-treat the wound bobbins in situ upon the same perforated bobbins. However, inasmuch as the liquid treatment pulsates the packages upon openings in the bobbins, which openings would render difficult, if not impossible, the spinning of the wound bobbin in perfect cylindrical formation, removable bobbin attachments are provided for covering these openings during the spinning operation.

The removable bobbin attachments above-mentioned form part of the subject matter claimed in the instant application, being termed means for use in spinning and in liquid-treating tubular rayon packages. The claims of the instant application are directed to means for use in liquid-treating tubular rayon packages, and means for use in spinning and in liquid-treating annular rayon packages.

The annexed drawings and the following description set forth in detail certain means illustrating my improved rayon-package supports and improved support-attachments, such means disclosing, however, only a few of the various forms in which the principle of the improved supports and attachments may be embodied.

In said annexed drawings:

Figure 1 is a vertical section of a fragmentary portion of a treatment casing in which a plurality of rayon cakes are mounted for liquid treatment, each of said cakes being provided with an insert of one of my improved forms, the view showing one vertical tier of the cakes;

Figure 2 is a plan section of one of the rayon cakes mounted upon the form of insert shown in Figure 1, the plane of section being indicated by the line 2—2, Figure 1, and the cake being shown in that shape in which it is spun, or, if it has been deformed inwardly by previous liquid treatment, in which it tends to reestablish itself, when the pressure of the treating liquid is from the inside of the cake towards the outside;

Figure 3 is a view similar to Figure 2, but indicating the shapes and positions which the cake and its constituent portions assume, or tend to assume, when the liquid pressure is from the outside of the cake towards the inside;

Figure 4 is a perspective view of the form of insert shown in the preceding three views;

Figure 5 is a perspective view similar to Figure 4, but showing a modified form of improved insert;

Figure 6 is a plan view of the insert shown in Figure 5, the rayon cake mounted on the insert being suggested in this view in dot-and-dash outline;

Figure 7 is a side elevation of the insert shown in Figures 5 and 6, the cake being suggested, both this figure and Figure 6 indicating the cake location in order clearly to show the portions of the top ring of the insert which overhang the cake;

Figure 8 is a perspective view of a second modified form of insert, the same being provided with rubber protectors for those portions thereof which contact the rayon cake;

Figure 9 is a vertical section through a rayon cake, mounted on the form of insert shown in Figure 8;

Figure 10 is a plan section, taken on the plane indicated by the line 10—10, Figure 9, this view showing the shape in which the cake is spun, or, if it has been deformed inwardly by previous liquid treatment, in which it tends to reestablish itself, when the pressure of the treating liquid is from within outwardly;

Figure 11 is a plan view of a rayon cake mounted on an insert such as shown in Figure 8;

Figure 12 is a view similar to Figure 10 but showing the position assumed by the cake, or which it tends to assume, when the pressure of the treating liquid is from the outside inwardly, the view showing how the outside wall of this form of perforated insert acts as a stop to the inward movement of the cake body under liquid pressure;

Figure 13 is a perspective view of a third modified form of cake insert, this insert being made of wire and provided with stops intermediate of, and relatively interiorly of, four fingers which contact the inner wall of the cake. The rubber covering which incases the finger contacts has been omitted from this view for the sake of clearness.

Figure 14 is a vertical section through a rayon cake mounted on the form of insert shown in Figure 13, this view showing that the insert wires which permanently contact the cake are covered with rubber;

Figure 15 is a plan section, taken on the plane indicated by the line 15—15, Figure 14, and showing the shape in which the cake is spun, or, if it has been deformed inwardly by previous liquid treatment, in which it tends to reestablish itself, when the pressure of the treating liquid is from within outwardly;

Figure 16 is a plan view of the cake and insert shown in Figure 14;

Figure 17 is a view similar to Figure 15, but showing the change in shape assumed by the cake, or which it tends to assume, when the liquid pressure is from without inwardly;

Figure 18 is a vertical section through a rayon cake mounted on a fourth modified form of insert, which insert is fitted with a plurality of spaced longitudinal outwardly-extended hard rubber bars, substantially triangular in cross-section, which permanently contact the inner wall of the rayon cake, these hard rubber bars being secured to the metal body of the insert by means of wires embedded in the rubber and locked at their ends in the metal body, the view being taken in the planes indicated by the line 18—18, Figure 19;

Figure 19 is a plan section, taken in the plane indicated by the line 19—19, Figure 18;

Figure 20 is a fragmentary vertical section similar to a portion of Figure 1, but showing a wound bobbin type of rayon package and a form of support for rayon packages of the bobbin type;

Figure 21 is a plan section, taken on the plane indicated by the line 21—21, Figures 20 and 22, the shape in which the wound bobbin is spun, or, if it has been deformed inwardly by previous liquid treatment, in which it tends to reestablish itself, when the flow of treating liquid is from within outwardly, being shown in full lines, and the shape assumed by the wound bobbin package, or which it tends to assume, when the flow of treating liquid is from without inwardly, being suggested by dot-and-dash lines;

Figure 22 is a vertical axial section, taken in the plane indicated by the line 22—22, Figure 21;

Figure 23 is a fragmentary axial section, taken in the plane indicated by the line 23—23, Figure 21;

Figure 24 is a fragmentary axial section of the wound-bobbin-supporting-and-rotating portion of a spindle of a spinning machine provided with a perforated bobbin support and a support attachment, both of which embody my improvements, the attachment serving to hold the thread circular as it is being collected from the precipitating bath and thus insure cylindrical inner and outer surfaces for the wound collected bobbin. Thus a regularly annular wound bobbin package is gathered even if the wound bobbin being gathered is supported only at spaced points by the support or, in other words, is being gathered on a perforated support having comparatively large windows or openings;

Figure 25 is a cross-section, taken in the plane indicated by the line 25—25, Figure 24;

Figure 26 is an axial section, similar to Figure 22, but showing a wound bobbin support provided with longitudinal stops to limit the inward movement of the walls of the wound bobbin package when subjected to the pressure of a treating liquid flowing inwardly of the package;

Figure 27 is a cross-section, taken in the plane indicated by the line 27—27, Figure 26, the shape in which the wound bobbin package is spun, or, if it has been deformed inwardly by previous liquid treatment, in which it tends to reestablish itself, when the flow of treating liquid is from within outwardly, being shown in full lines, and the shape assumed by the wound bobbin package, or which it tends to assume, when the flow of treating liquid is from without inwardly, being suggested by dot-and-dash lines; and Figure 28 is a view similar to Figure 25, but showing necessarily modified shell portions of the attachment for the bobbin support, when the support is provided with the stops shown in Figures 26 and 27.

Referring to the annexed drawings in which the same parts are indicated by the same respective numbers in the several views, and particularly referring to Figure 1, I therein disclose a fragmentary portion of a movable treatment casing 3 having a base 3², and within which is mounted a vertical tier of spaced rayon cakes 6 each provided with one of my improved inserts 10. The adjacent ends of adjacent cakes are separated by annular hard rubber spacers 32, the ends of the cakes abutting the respectively contiguous flanges 32' of the spacers, there being provided for the tier of cakes a hard rubber base 31 having a flange 31' and a hard rubber cap 33 having a flange 33'. The inserts 10 contact top and bottom with the body portions 32 of the spacers, or with the body portions 31 and 33 of the base and top, respectively. As described in my application on processes of, and apparatus for, treating fine filamentous thread, filed even date herewith, several tiers of cakes 6 mounted on inserts 10, similar to the tier shown in Figure 1, are positioned in the treatment casing 3 for simultaneous treatment by the liquid which fills the casing and which is circulated therethrough. The constituent parts of the tier of cakes and spacers are locked together in a vertical direction by a spider 36 having arms 37 (one of which is shown in Figure 1) which arms 37 are formed into pads which are fastened down upon the tops of the tier caps 33 by means of a nut 40 which engages the top of a rod 34 passing through the body of the spider 36 and whose bottom end is engaged with a boss 35 extended upwardly from the base 3² of the treatment casing 3. The interiors of the vertically-aligned cakes 6 are in communication through the central openings of the spacers 32 so that all the cakes 6 in the vertical tier form a single interior chamber 41.

The flow direction of the treating liquid is periodically reversed so as to cause the same to flow part of the time from the chamber 42, which is within the casing 3 but which is exteriorly of the cake 6, through the cake 6 to the chamber 41 within the tier of cakes, and at other times to flow from said interior chamber 41 through the cakes 6 to the exterior chamber 42. The base 3² of the treatment casing 3 is formed with two series of openings, one of which series is indicated by the opening 45 communicating with the chamber 42, and the other by the opening 43 communicating with the interior chamber 41. The opening 43 is actually formed in a flanged hard rubber bushing 44 which is externally threaded and engages at one end the body part of the hard rubber base 31 and thus fastens the tier base 31 to the base 3² of the treatment casing 3.

The treatment liquid is derived from a suitable source, and circulated and reversed in flow-direction by suitable means, as fully disclosed in the above-mentioned other application filed current date herewith. The treating liquid passes to and from the ports 43 and 45, in coming from and returning to the circulating means, via chambers 47 and 48 formed in a treatment base, which chambers 47 and 48 are separated by partition members 26, portions of which are suggested in Figure 1. The movable treatment casing 3 rests upon a rubber gasket 30 mounted on a fixed working base (not shown, except that a portion of said base is suggested by the partition members 26).

All parts of the apparatus subject to corrosion, or capable of contaminating the treating liquid and/or the rayon packages, are covered by non-corrosive material or may be made of non-corrosive material. These protective means, insofar as shown in the drawings of this application, include the rubber spacers 32, bases 31, and caps 33; the rubber bushing 44; a rubber covering 27 for the partitions 26; a rubber gasket 30 upon which the treatment casing 3 rests; a rubber covering 38 for the rod 34 and the boss 35; a rubber covering 39 for the spider 36 and clamping pad 37; a rubber covering 50 for the exterior of the treatment casing 3; and a rubber covering 49 for the interior of the treatment casing 3.

Referring particularly to Figures 2, 3, and 4, I therein disclose one of the forms of my improved insert 10 upon which the cake 6 is mounted when it is being treated in the manner indicated in Figure 1. This insert 10 is of skeleton formation and consists of two split end rings 111 connected by spaced bars 112, Figure 4.

Comparatively large openings or windows are formed between each adjacently two bars 112. The bars 112 are somewhat longer than the depth of the cake 6 so that the latter can be mounted between adjacent flanges 32' of the spacers 32, Figure 1, and the insert 10 can be mounted between the body portions of adjacent spacers 32. Those portions of the insert 10 which are subject to corrosion by the alkali and acids contained in or on the thread of the cake 6, or which would contaminate the cake 6, are covered with protective material, as indicated by the split rubber sheaths 113 for the bars 112 of the insert 10, Figure 4.

In the form of insert shown in Figures 2, 3, and 4, four of the bars 112 spaced ninety (90) degrees apart define a circle of an area equal to the cross-sectional area of the interior space within the tubular cake 6 which it is intended to mount upon the insert. The insert openings between the adjacent bars 112 are in effect open longitudinal windows of material size, large enough to permit substantial portions of the cake 6 to move in, and under the action of, the treating liquid. Actually, the cake portions pulsate in and out through these several windows during the liquid treatment, tending to maintain themselves in their original shape, Figure 2, or to reestablish themselves in such original shape, when the direction of liquid flow is that indicated by the arrows in Figure 1, i. e., from within the cake outwardly therethrough, and tending to assume the shape shown in Figure 3, when the direction of liquid flow is opposite to that shown by the arrows in Figure 1. The deformed inner face portions 114 and outer face portions 115, Figure 3, illustrate the condition assumed by the cake, or which it tends to assume, when the liquid flow is inwardly of the cake, these deformed faces 114 or 115 being wavy or irregular, as suggested by the numbers "116". The package portions 114 and 115 each comprise end parts adjacent the bars 112 which have adjusted themselves somewhat outwardly during the inward movement of the treating liquid and a part intermediate the end parts which have been moved inwardly by the liquid pressure. This result consequent to the pressure of the inwardly moving liquid is also clearly shown in Figures 21 and 27. The package is loosened up by these movements and adjustments of its several portions.

Two or three of the bars 112 might be used, or a number thereof greater than four, provided insert windows of large enough size are provided to permit cake portions to pulsate therethrough under the action of the treating liquid.

The contractibility of the insert 10, incident to the split ring formation of the end rings 111, provides for the convenient and non-damaging insertion of the insert 10 into the cake, the insert 10 being permitted to expand when completely inserted within the cake 6, so that the spaced rubber-covered bars 112 thereof contact with the inner face of the cake, as clearly seen in Figure 2. During the liquid treatment the inserts 10 are held substantially rigid by the clamped tier of cakes 6, spacers 32, base 31, and cap 33.

Referring particularly to Figures 5, 6, and 7, I therein disclose a cake insert 10 comprised of a series of spaced elongated U-shaped wire portions having legs 117 and 118 connected at the bottom, the legs 117 being located interiorly of the respective legs 118, and the adjacent U-shaped wire portions being connected at the top by the curved sections 119, having inwardly-extended angular end portions 120. The construction is such, as clearly indicated in Figures 6 and 7, that the top portions 119 overhang the cake 9; whereas, the U-shaped members 117—118 are contained within the cake, with the outer leg portions 118 contacting the inner face of the cake. Actually, the inner face of the cake contacts with split rubber sheaths 121 which cover the leg portions 118 for substantially the full length of the latter. The ring formed by the members 119 and 120 is split, as indicated by "119'", Figure 5, in order that the insert 10 may be contracted for convenient and non-damaging insertion into the cake 6, and then permitted to expand so that the rubber sheaths 121 will contact the inner face of the cake 6 at spaced points.

Referring particularly to Figures 8, 9, 10, 11, and 12, a form of insert is therein shown in which a split ring shell 122 is provided with a plurality of perforations 123 and has formed upon its exterior face a plurality of spaced longitudinal small bulb T's 124 covered with split rubber sheaths 125. When a cake 6 is mounted upon this form of insert, as indicated in Figures 9, 10, and 12, and the cake is subjected to the action of a treating liquid applied to the outer face of the cake and tending to pass therethrough to the inner face thereof, the cake portions assume the respective positions shown in Figure 12, or tend to assume these positions, the inside face and the outside face of the cake, under these conditions, being denoted by the numbers "126" and "127", respectively, Figure 12, both of these faces having an irregular or wavy outline. When the treating liquid is applied to the inside face of the cake and tends to pass therethrough to the outer face thereof, the cake 6 is maintained in the condition shown in Figure 10, or is reestablished into such condition, or tends to be so reestablished. When the type of insert shown in these Figures 8, 9, 10, 11, and 12 is utilized, the outer surface of the shell 122 serves as a stop to limit the maximum possible amount of inward movement of the cake portions, under the action of the treating liquid from without inwardly, as clearly indicated in Figure 12. The windows through which the pulsating movements of the cake are effected are formed by and between adjacent bulb T's 124.

Referring particularly to Figures 13, 14, 15, 16, and 17, I therein disclose a modified form of cake insert preferably formed of wire and having a plurality of spaced longitudinal wire fingers 128 provided with split rubber sheaths 129. The fingers 128 are formed with interior longitudinally-extending portions 130 each connected by upper-end U-joints 132 with an interiorly-located stop member 131 of elongated U-formation. These stop members 131 are in turn connected at the top by outwardly-extended U-shaped joints 133 with the respectively adjacent fingers 128. When this form of insert is utilized as a mounting for the cakes, the split rubber sheaths 129 contact the inner face of the cake 6 at spaced intervals, and the outwardly-extended U-joints 132 and 133 at the upper end of the insert overlie the top face of the cake 6, as clearly indicated in Figures 14 and 16. The respective positions assumed by the different cake portions, or tended to be assumed, when the cake mounted upon this form of insert is subjected to the action of a treating liquid applied from without inwardly, is clearly shown in Figure 17, wherein the inside face and the outside face of the cake are indicated by the respective numbers "134" and "135", both of which faces are of irregular or wavy outline. The members 131 serve to define the maximum possible amount of inward movements of the several cake portions under the action of a treating liquid applied to the outer face of the cake 6.

Referring particularly to Figures 18 and 19, a form of insert is therein shown comprising a split ring shell body 136 formed with a plurality of perforations 137, and provided exteriorly of its outer face with a plurality of spaced hard rubber bars 138, triangular in cross-section, and secured to the shell 136 by means of wire locks 139 embedded in the rubber bodies 138 and having hook-end locking portions 139' passed through, and secured to the inner face of, the shell body 136. When this form of insert is used as a mounting for the cake 6, the apices of the several triangular rubber bars 138 contact the inner face of the cake at spaced points, and the outer surface portions of the shell 136 between the respectively adjacent rubber bars 138 form stops determining the maximum possible inward movement of the respective cake portions, when a treating liquid is applied to the outer face of the cake and is passed through the body of the latter, or tends to so pass. The windows through which the pulsating movements of the cake are effected are formed by and between adjacent rubber bars 138.

Referring particularly to Figures 20, 21, 22, and 23, there is therein shown a form of support 10' for rayon packages of the wound spool or bobbin type. A fragmentary portion of a vertical tier of such wound bobbin packages 7 is shown in Figure 20, the vertically adjacent wound bobbins 7 being spaced apart by upper and lower laterally-extended flanges 141 of annular spacers 140. The respective wound bobbins 7 are spaced apart a distance equal to the combined depth of the flange portions of a spacer 140, and the body portions of the spacers 140 are spaced apart by the bobbin supports 10'. These supports 10' each comprise a pair of end rings 142 connected by a plurality of spaced longitudinal bars 143 having split rubber sheaths 144. As is well-known in the art, and as is clearly shown in Figure 20, the wound bobbin type of package is gathered or spun with tapered end faces, so I make the flanges 141 of the spacers 140 also of tapered formation to conform to the end faces 7' of the wound bobbin 7, and thus cause the end faces 7' of the wound bobbin 7 and the adjacent faces of the flanges 141 closely to contact one with the other throughout the entire distance wherein they are in vertical alignment. When the wound rayon bobbin 7 is mounted upon the support 10' and is subjected to the action of a treating liquid applied to the outer surface of the wound bobbin 7, spaced wound bobbin portions pass through the openings of the bobbin 10' between the respectively adjacent bars 143 and assume the positions clearly indicated in Figure 21, or tend to assume these positions, the inner face and the outer face of the wound bobbin 7, under these conditions, being indicated by the respective numbers "145" and "146", both being of irregular or wavy outline.

Referring particularly to Figures 24 and 25, a type of bobbin such as shown in Figure 20 is provided, but these Figures 24 and 25 also disclose a bobbin attachment applied to the wound-bobbin-collecting spindle of a spinning machine, whereby the wound bobbin can be collected with substantially cylindrical inner and outer faces although it is being collected on a bobbin or support which is provided with windows or openings large enough to permit the inward and outward pulsation of the wound bobbin package through such openings when the package is being processed by a treating liquid applied thereto alternately in opposite directions. In other words, the wound bobbin package 7 is gathered upon the same support or bobbin as is used for the liquid-treating operations applied to the wound bobbin subsequent to the collecting or spinning of the wound bobbin, even though this support is provided with the comparatively large openings or windows.

The bobbin attachment above-mentioned is formed with a hub member 147 secured to the bobbin-rotating spindle 148 of a spinning machine by means of a set screw 149. Formed upon the outer surface of the hub member 147 are a plurality of transversely spaced ears 151 to which are pivotally secured by means of pins 152 a plurality of spaced longitudinal arms 153 having hub portions 154 mounted on the pins 152, which hub portions 154 are formed with heels 154' closely contacting the outer surface of the hub member 147. Each of the arms 153 is formed with an arcuate plate 155 of a peripheral width slightly less than the arc between contiguous bobbin bars 143 of the circle defined by such bars 143, each plate 155 lying between two adjacent bars and having its outer surface lying in the circle defined by the bobbin bars 143. These plates 155 have end extensions 156 adapted to contact at their outer side surfaces with the inner surface of one of the bobbin end rings 142. When the wound bobbin package 7 is being gathered or collected by the spinning machine, the plates 155 form wound-bobbin-supporting members between the respectively adjacent bars 143 of the bobbin 10'. All parts of the bobbin attachment capable of contaminating the wound bobbin package are made of hard rubber, or bakelite, or other non-corrosive material, or may be covered with non-corrosive material.

Extended inwardly from the center of the wound-bobbin-supporting plates 155 are radial webs 157 having inner end clamping pad portions 158 of arcuate formation. These pad portions 158 are adapted to contact the outer cylindrical surface of a spreading head 160 having an extended conical portion 160' and formed upon a rod 159 having a handle 162 at one end and a pin extension 161 at the other end adapted to engage a recess 150 in the hub member 147. Outward movement of the rod 159 is limited by an enlarged shoulder portion 174 thereof which is adapted to contact the inner ends of the pads 158. When there is no bobbin on the spinning machine, and therefore the attachment is not supported, the arms 153 are compressed by a rubber band 173 seated in a groove formed in the exterior face of the plates 155, which band 173 prevents the lowermost arms 153 from falling outwardly. The arms 153 are prevented from falling inwardly by reason of the contact of the heel members 154' with the outer surface of the hub member 147.

When it is desired to spin a rayon bobbin 7 upon a bobbin or support 10' and upon the spindle of a spinning machine having my improved attachment, the bobbin 10' is applied to the attachment, which is fixed to the spinning machine spindle, in the following manner. The bobbin 10' is passed over the arms 153 of the attachment with the bars 143 of the bobbin passing between the adjacent edges of adjacent wound-bobbin-supporting plates 155, as shown in Figure 25, and the end extensions 156 of the plates 155 passing through one end ring 142 of the bobbin 10', as shown in Figure 24. Meanwhile, the inner extension 161 of the rod 159 has been positioned in its innermost position in the recess 150 of the hub member 147. This rod 159 is then pulled outwardly by means of the handle member 162, the conical head portion 160' facilitating the entrance of the head 160 within the circle defined by the clamping plates 158, the outward movement of the rod 159 being continued until the shoulder 174 engages the inner ends of the clamping plates 158, as clearly shown in Figure 24. Thus the pads 158 are tightened so as to position the wound-bobbin-supporting plates 155 substantially in the circle defined by the rubber sheaths 144 of the bobbin bars 143, which is the circle that it is desired to define by the inner face of the wound bobbin 7 when it is gathered or spun.

Referring particularly to Figures 26, 27, and 28, there is therein shown a form of bobbin or support 10' which comprises a pair of end rings 163 connected by a plurality of spaced longitudinal rods 164 covered with split rubber sheaths 165. This type of bobbin also includes spaced stops 166 lying intermediate the adjacent pairs of longitudinal rods 164, these stops 166 being positioned interiorly within the circle defined by the rods 164. These stops 166 serve to limit the maximum possible amount of inward movement made by the wound bobbin package when the treating liquid is applied to the outer face of the package and passes through the package or tends to pass therethrough. The positions assumed by the several package portions, or tended to be assumed, when the treating liquid is applied from without inwardly, is indicated by dot-and-dash lines in Figure 27, wherein the inner face and outer face of the wound bobbin package are indicated by the respective number "169" and "170", both of said faces being of irregular or wavy outline. The full line position shown in Figure 27 shows the condition in which the wound bobbin is spun and in which it is maintained when the pressure of the treating liquid is from within outwardly, or in which the bobbin tends to re-establish itself, if it has been previously deformed by treating liquid applied from without inwardly.

In Figure 28 are indicated some necessary changes in the structure of the bobbin attachment, when the bobbin 10' is provided with stops, such as the stops 166 shown in Figures 26 and 27. Under such conditions, each wound-bobbin-supporting plate 155 of Figures 24 and 25 is subdivided into a pair of arcuate plates 168, Figure 28, each of which plates 168 is connected to the clamping pad 158 by means of an end web 167.

Important advantages attach to the spinning of the rayon packages of bobbin formation upon bobbins which are of such constructions that they can also be used as supports, after spinning, for the necessary purification and other processing. It is necessary with previous types of bobbins to unwind the rayon package from the bobbin and rewind into other package forms, after washing, and before subsequent processing, and in so doing, the rayon fibres are damaged, and other injurious results occasioned. If the rayon package upon the previous types of bobbin is not so rewound, the benefits of the inward shrinkage of the package obtained by my improved process cannot be realized. My improved attachments for the wound-bobbin-supporting shafts of spinning machines permit proper collection of the rayon bobbins upon perforated bobbins which then serve as suitable supports upon which the wound rayon bobbins remain mounted for subsequent processing. As will be clearly seen in Figures 25 and 28, the plates 155 and 168, respectively, do not fill the entire collecting surface portions between the adjacent bars 143 and 164, but do complete the collecting surface to an extent sufficient to make a continuous collecting surface from a practicable standpoint. In other words, the comparatively slight spaces between the edges of the plates 155 and 168 and the adjacent bars 143 and 164 are not large enough to prevent the connection of the wound bobbin with substantially cylindrical inner and outer faces.

My improved forms of inserts and bobbins are also adaptable to the well-known drip-washing of rayon packages. The cakes or wound bobbins mounted on the inserts or bobbins may or may not be rotated while water is permitted to drip over the cakes or wound bobbins. Preferably, the inserts and bobbins are supported between spacers held in position similar to the stacking arrangement of the cakes and inserts, and wound bobbins and bobbins, shown in Figures 1 and 20, respectively. Furthermore, in lieu of the drip method, the treating liquid can be applied to the rayon packages mounted on my improved inserts and bobbins and stacked as shown in Figures 1 and 20, through a perforated tubular pipe located within the stack, the liquid being applied without pressure, thus loosening up the package and inducing inner movement thereof.

When spinning wound bobbin packages, the thread is gathered untwisted, and therefore it is necessary subsequently to twist the thread on a separate machine known as a "twister" or a "spinner". I wish to point out that the elongated windows of my improved forms of bobbin do not offer resistance to free twisting, since the bobbin with the wound rayon bobbin mounted on it is revolved at a high speed during the twisting operation causing the cross-sectional shape of the wound bobbin package to take a form similar to that which it assumes, or tends to assume, when it is subjected by my improved process to the action of a treating liquid moving from within the package outwardly. Since the rayon thread is dry when being twisted, no unequal strains such as my improved process seeks to eliminate are set up by the centrifugal action.

What I claim is:

1. Means for use in liquid-treating annular rayon packages comprising end members, members connecting the end members and forming a support upon which a package may be mounted, adjacent members of said last-named members being spaced apart a distance sufficient to form openings permitting substantial portions of the rayon package to move inwardly relatively to the rayon support, under the action of a treating liquid, and other members secured to the first-named members and forming positive stops limiting the amount of rayon movement.

2. Means for use in liquid-treating annular rayon packages comprising end rings, a plurality of spaced longitudinal members connecting the end rings and forming a support upon which a package may be mounted, transversely-adjacent members being spaced apart a distance sufficient to form openings through which substantial portions of the rayon package may be moved radially relatively to the support by the action of a treating liquid, and means forming positive stops limiting the amount of rayon movement.

3. Means for use in liquid-treating annular rayon packages comprising end rings, a plurality of spaced longitudinal members connecting the end rings and forming a support upon which a package may be mounted, transversely-adjacent members being spaced apart a distance sufficient to form openings through which substantial portions of the rayon package may be moved radially relatively to the support by the action of a treating liquid, and bars disposed between each adjacent two of said longitudinal members and adjacent to the respective openings and limiting the amount of rayon movement.

4. Means for use in liquid-treating annular rayon packages comprising a wire bent to form a broken ring and having U-shaped extensions connecting the severally adjacent portions of the ring, said extensions also projecting in spaced relation transversely to the plane of the ring and defining a circular package support, adjacent extensions being spaced apart a distance sufficient to form openings permitting substantial portions of the rayon package to move inwardly under the action of a treating liquid, and means forming stops limiting the amount of rayon movement.

5. Means for use in liquid-treating annular rayon packages comprising a wire bent to form a broken ring and having U-shaped extensions connecting the severally adjacent portions of the ring, said extensions also projecting in spaced relation transversely to the plane of the ring, alternate extensions having one leg thereof disposed interiorly of the other leg, the outer legs defining a package support, the other extensions being disposed between said outer legs and adjacent the openings between the latter and forming stops limiting the amount of package movement inwardly of said outer legs, adjacent outer legs being spaced apart a distance sufficient to form openings permitting substantial portions of the rayon package to move inwardly under the action of a treating liquid.

6. Means for use in liquid-treating tubular rayon packages comprising a perforated shell provided with spaced outwardly-extending longitudinal bars.

7. Means for use in liquid-treating tubular rayon packages comprising a perforated shell provided with spaced outwardly-extending longitudinal non-corrosive bars.

8. Means for use in liquid-treating tubular rayon packages comprising a perforated shell, spaced longitudinal rubber bars disposed exteriorly of the shell, and means incorporated within the bars for securing the latter to the shell.

9. Means for use in spinning and in liquid-treating annular rayon packages comprising a skeleton bobbin defining a cylindrical collecting surface and having openings in the plane of the collecting surface of sufficient size to permit substantial portions of a wound package to move relatively to the bobbin under the action of a treating liquid, means removably attached to the bobbin and insertable in said openings to make a practicably continuous cylindrical collecting surface, and positive stop members disposed adjacent the respective openings for limiting the amount of wound-bobbin movements when said insertion means are removed.

10. Means for use in spinning and in liquid-treating annular rayon packages comprising a skeleton bobbin defining a cylindrical collecting surface and having openings in the plane of the collecting surface of sufficient size to permit substantial portions of a wound package to move relatively to the bobbin under the action of a treating liquid, means removably attached to the bobbin and insertable in said openings to make a practicably continuous cylindrical collecting surface, and positive stop members secured to said bobbin and disposed adjacently interiorly of the respective openings for limiting the amount of wound-bobbin movements inwardly of said openings when said insertion means are removed.

11. Means for use in liquid-treating tubular rayon packages comprising a support defining a surface upon which a package may be assembled, said support having spaced members forming openings of sufficient size to permit substantial portions of the package to move relatively to the support under the action of a treating liquid, and means forming positive stops limiting the amount of rayon movement.

12. Means for use in liquid-treating annular rayon packages comprising a support upon the exterior surface of which a package may be assembled, said support having transversely spaced members forming openings of sufficient size to permit substantial portions of the package to move inwardly and outwardly relatively to the support under the action of a treating liquid, and other members secured to the support and positioned interiorly of the latter and forming positive stops limiting the amount of inward rayon movement.

13. Means for use in liquid-treating rayon packages comprising a perforated shell provided with spaced outwardly-extended bars.

14. Means for use in liquid-treating rayon packages comprising a perforated shell provided with spaced outwardly-extended rubber-covered bars.

15. Means for use in spinning and in liquid-treating annular rayon packages comprising a skeleton bobbin defining a cylindrical collecting surface and having openings in the plane of the collecting surface of sufficient size to permit substantial portions of a wound package to move relatively to the bobbin under the action of a treating liquid, removable means insertable in said openings to make a practicably continuous cylindrical collecting surface, and positive stop members disposed radially adjacent the respective openings for limiting the amount of wound-bobbin movements when said insertion means are removed.

16. Means for use in spinning and in liquid-treating annular rayon packages comprising a skeleton bobbin defining a cylindrical collecting surface and having openings in the plane of the collecting surface of sufficient size to permit substantial portions of a wound package to move relatively to the bobbin under the action of a treating liquid, removable means insertable in said openings to make a practicably continuous cylindrical collecting surface, and positive stop members disposed radially inwardly of the respective openings for limiting the amount of wound-bobbin movements inwardly of said openings when said insertion means are removed.

CHARLES A. HUTTINGER.